(12) United States Patent
Shin (10) Patent No.: US 11,516,526 B2
(45) Date of Patent: Nov. 29, 2022

(54) METHOD AND APPARATUS FOR SYNCHRONIZING CAMERA IMAGE BASED ON GM CLOCK TIME INFORMATION

(71) Applicant: HYUNDAI MOBIS CO., LTD., Seoul (KR)

(72) Inventor: Jang Ho Shin, Hwaseong-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 176 days.

(21) Appl. No.: 17/109,070

(22) Filed: Dec. 1, 2020

(65) Prior Publication Data

US 2021/0176379 A1     Jun. 10, 2021

(30) Foreign Application Priority Data

Dec. 5, 2019   (KR) .................. 10-2019-0160848

(51) Int. Cl.
*H04N 21/242*     (2011.01)
(52) U.S. Cl.
CPC ................................ *H04N 21/242* (2013.01)
(58) Field of Classification Search
CPC ...... H04N 5/04; H04N 21/242; H04N 5/0733; H04N 5/23206; H04N 5/247
USPC .............. 348/500, 521, 537, 536; 370/350
See application file for complete search history.

(56) References Cited

U.S. PATENT DOCUMENTS

2018/0176424 A1*  6/2018  Christi ................ H04N 7/181
2022/0103335 A1*  3/2022  Moon .................. H04L 7/005

* cited by examiner

*Primary Examiner* — Sherrie Hsia
(74) *Attorney, Agent, or Firm* — H.C. Park & Associates, PLC (57) ABSTRACT

An electronic control apparatus including a time synchronizing unit configured to collect GrandMaster (GM) clock time information and to perform time synchronization based on the GM clock time information, a comparison unit configured to receive video frames captured from a camera among multi-channel cameras, to compare time information of the video frames with the GM clock time information, and to thereby generate and output delay time information for the video frames to be delayed compared to the GM clock time information; and an image synchronizing unit configured to perform image synchronization between the multi-channel cameras by adjusting an image output time of the camera based on the delay time information.

12 Claims, 7 Drawing Sheets

METHOD AND APPARATUS FOR SYNCHRONIZING CAMERA IMAGE BASED ON GM CLOCK TIME INFORMATION

CROSS-REFERENCE TO RELATED APPLICATION

This application claims priority from and the benefit of Korean Patent Application No. 10-2019-0160848, filed Dec. 5, 2019, which is hereby incorporated by reference for all purposes as if set forth herein.

BACKGROUND

Field

Exemplary embodiments relate to a method and apparatus for synchronizing camera images based on GrandMaster (GM) clock time information. More particularly, the present disclosure relates to a method and apparatus for synchronizing images from 4-channel cameras in a vehicle Ethernet environment.

Discussion of the Background

The statements in this section merely provide background information related to the present disclosure and do not necessarily constitute prior art.

Vehicles are equipped with various electronic control apparatuses for improving driver convenience and safety, and in-vehicle communication networks for mutual communication between these electronic control apparatuses are also provided.

Many vehicle manufacturers are introducing Ethernet as an intra-vehicle communication network along with Ethernet-based Surround View Monitor (SVM) systems which have been also mass-produced.

The SVM system is adapted to obtain images around the vehicle through 4-channel cameras mounted on all four sides of the vehicle and utilize the obtained images as a basis for the driver when parking the vehicle to view surroundings through a display device mounted inside the vehicle. By using the SVM system, the driver can grasp the situation around the vehicle at a glance and safely park or maneuver through narrow roads.

Meanwhile, in a conventional SVM system, there are inevitably different on-time points of the mounted 4-channel cameras, and errors are destined to accumulate in the image output time between the cameras due to changes in the camera exposure time during the operation process. This means that performance degradation may occur due to image distortion or the like in the surround-view provided by the SVM system.

A solution to this issue requires an image synchronization process of controlling the output points of the cameras externally or equalizing the image output points of the 4-channel cameras through communications between the cameras. However, in a complex communication environment, there is a limitation that communications between cameras place a significant load on the system. Besides, with an engagement of external control, there is a limitation that establishing real-time external communications with the cameras is difficult in an Ethernet environment.

The above information disclosed in this Background section is only for enhancement of understanding of the background of the invention and, therefore, it may contain information that does not constitute prior art.

SUMMARY

Exemplary embodiments of the present invention provide an electronic control apparatus including a time synchronizing unit, a comparison unit, and an image synchronizing unit. The time synchronizing unit is configured to collect GrandMaster (GM) clock time information and to perform time synchronization based on the GM clock time information. The comparison unit is configured to receive video frames captured from a camera among multi-channel cameras, to compare time information of the video frames with the GM clock time information, and to thereby generate and output delay time information for the video frames to be delayed compared to the GM clock time information. The image synchronizing unit is configured to perform image synchronization between the multi-channel cameras by adjusting an image output time of the camera based on the delay time information.

In addition, according to another embodiment, the present disclosure provides a method of synchronizing images including performing a time synchronizing process, performing a comparison process, and performing an image synchronizing process. The performing of the time synchronizing process includes collecting GrandMaster (GM) clock time information and performing time synchronization based on the GM clock time information. The performing of the comparison process includes receiving video frames captured from a camera among multi-channel cameras, comparing time information of the video frames with the GM clock time information, and calculating and outputting delay time information for the video frames to be delayed compared to the GM clock time information. The performing of the image synchronizing process includes performing image synchronization between the multi-channel cameras by adjusting an image output time of the camera based on the delay time information.

It is to be understood that both the foregoing general description and the following detailed description are exemplary and explanatory and are intended to provide further explanation of the invention as claimed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

The present disclosure in some embodiments seeks to achieve synchronizing camera images based on GrandMaster (GM) clock time information, by performing an image synchronization process for adjusting the image outputs of the 4-channel cameras to be outputted at the same time in synchronization with the use of GM clock time information collected in the time synchronization process, whereby fundamentally solving the issue of performance degradation due to image tolerances in the SVM system while minimizing the use of communication protocols to achieve simplified system specifications and reduced system load.

Various terms such as first, second, A, B, (a), (b), etc., may be used solely for the purpose of differentiating one component from the other but not to imply or suggest the substances, the order or sequence of the components. Throughout this specification, when a part "includes" or "comprises" a component, the part is meant to further include other components, not excluding thereof unless there is a particular description contrary thereto. The terms such as "unit," "module," and the like refer to units configured to process at least one function or operation, which may be implemented by hardware, software, or a combination thereof.

Figure 1:
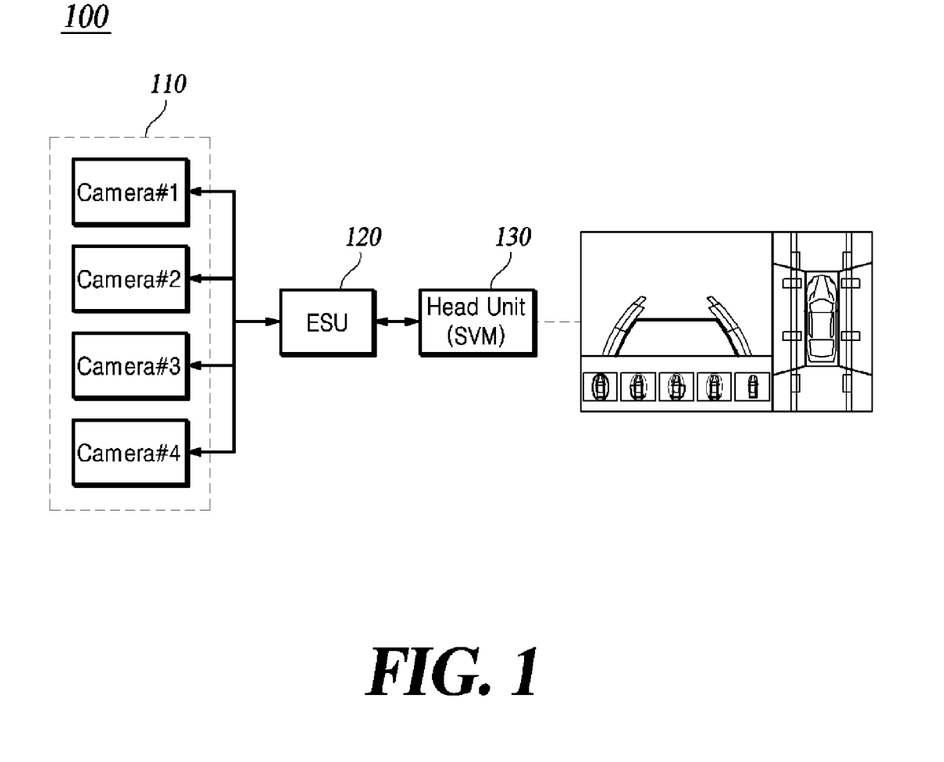
FIG. 1 is a schematic block diagram illustrating an SVM system according to at least one embodiment of the present disclosure.

FIG. 1 is a schematic block diagram illustrating an SVM system according to at least one embodiment of the present disclosure. Meanwhile, FIG. 1 shows architecture of an SVM system for providing a surround-view in an Ethernet environment of a vehicle.

As shown in FIG. 1, a Surround View Monitor (SVM) system 100 according to at least one embodiment includes cameras 110, an Ethernet switch unit (ESU) 120, and an SVM unit 130.

A plurality of cameras 110 may be provided in the vehicle and may generate and transmit image data by capturing video images.

In at least one embodiment, the cameras 110 may be implemented as four-channel cameras including first to fourth cameras. For example, the first camera obtains an image on the left side of the vehicle. The second camera obtains an image behind the vehicle. The third camera obtains an image on the right side of the vehicle. The fourth camera obtains an image in front of the vehicle.

A plurality of images respectively obtains by the first to fourth cameras are output in a frame unit.

The first to fourth cameras each include an image sensor (e.g., CCD or CMOS) for capturing images, an electronic control unit for controlling image data of the camera, a memory for storing image data, a communication module, etc.

In at least one embodiment, the first to fourth cameras are connected to the Ethernet switch unit 120, and a time synchronization process is performed between the Ethernet switch unit 120 by using gPTP, which is a communication synchronization protocol in the Ethernet environment.

Transmitting information using Ethernet communications needs a time synchronization process. Unless time synchronization is established, for example, when respective images of cameras installed on the front, rear, left and right sides of the vehicle are combined and displayed on one screen, it may occur distortion due to a time difference between the respective image displays.

In the time synchronization process of Ethernet communications, all entities connected to a local network participate in time synchronization. In Ethernet communications, information for time synchronization is transmitted and received between entities in addition to data to be transmitted. Among the transmitted and received time synchronization information, one entity with the most sophisticated clock is selected as the GrandMaster to provide the reference time to other entities.

Therefore, the first to fourth cameras receive GM clock time information from the Ethernet switch unit 120 that serves as a GrandMaster and perform a time synchronization process based on the GM clock time information. Meanwhile, a time synchronization process based on GM clock time information is common in the relevant field, and a detailed description thereof will be omitted.

In at least one embodiment of the present disclosure, the first to fourth cameras further perform an image synchronization process in addition to time synchronization. Here, the image synchronization is the process of correcting image outputs from the respective 4-channel cameras to be generated in synchronization to correct the image tolerances between the cameras caused by the difference in the turn-on time due to the structural difference of the 4-channel cameras or the change of the camera exposure time during the operation process.

In at least one embodiment, the first to fourth cameras utilizes the GM clock time information collected in the time synchronization process for adjusting the image outputs from the respective 4-channel cameras to be generated in synchronization. In adjusting the image outputs from the respective 4-channel cameras to be generated in synchronization, the first to fourth cameras operate based on the GM clock time information which is equally provided to the respective cameras as accurate time information that does not change irrespective of the operation of the individual cameras.

The incorporation of the image synchronization process according to at least one embodiment of the present disclosure provides a fundamental solution to the issue of performance degradation due to image tolerances in the SVM system while minimizing the use of communication protocols and thereby achieves simplified system specifications and reduced system load. Details thereof will follow in the process of describing an electronic control apparatus of FIG. 2.

The Ethernet switch unit (ESU) 120 is connected to the cameras 110 and various control devices in the vehicle, including the SVM unit 130, and it serves to distribute the signals of the respective control devices.

In at least one embodiment, the Ethernet switch unit 120 serves as a GrandMaster for time synchronization of all the control devices, and it sends the respective control devices a time synchronization message including GM clock time information for time synchronization.

The SVM unit 130 refers to a device that combines multiple images captured by the cameras 110 to provide a surround-view image. In particular, it may be a device that provides a top view or a bird's eye view about a vehicle.

In at least one embodiment of the present disclosure, the SVM unit 130 receives image outputs from the respective 4-channel cameras to be generated in synchronization according to the image synchronization process described above. This means that a more accurate surround-view image can be provided without distortion of the image compared to the prior art.

Figure 2:
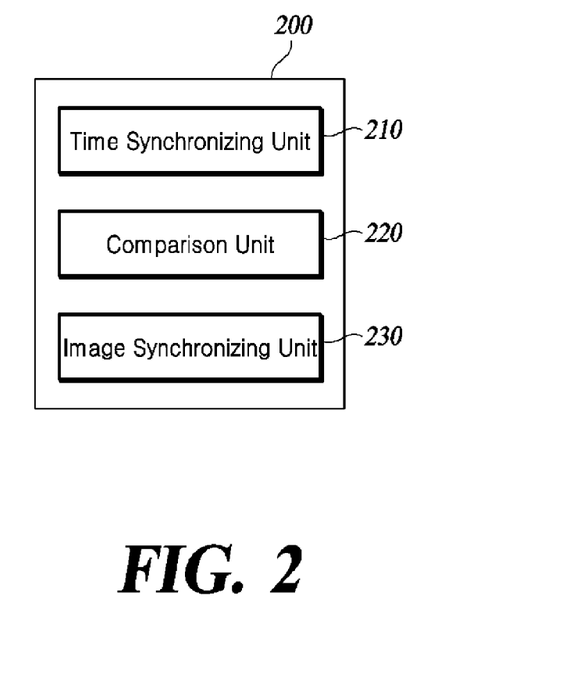
FIG. 2 is a schematic block diagram illustrating an electronic control apparatus according to at least one embodiment of the present disclosure.

FIG. 2 is a schematic block diagram illustrating an electronic control apparatus according to at least one embodiment of the present disclosure. An electronic control apparatus 200 illustrated in FIG. 2 may be implemented in a form included in the cameras 110 or may be implemented as a separate apparatus interlocked with the camera 100. The electronic control apparatus 200 is preferably provided for each of a plurality of cameras, although the present disclosure is not so limited.

The electronic control apparatus 200 according to at least one embodiment includes a time synchronizing unit 210, a comparison unit 220, and an image synchronizing unit 230. Here, the components included in the electronic control apparatus 200 are not necessarily limited thereto.

The time synchronizing unit 210 refers to a device that collects GM clock time information and performs a time synchronization process based on the collected GM clock time information.

Figure 4:
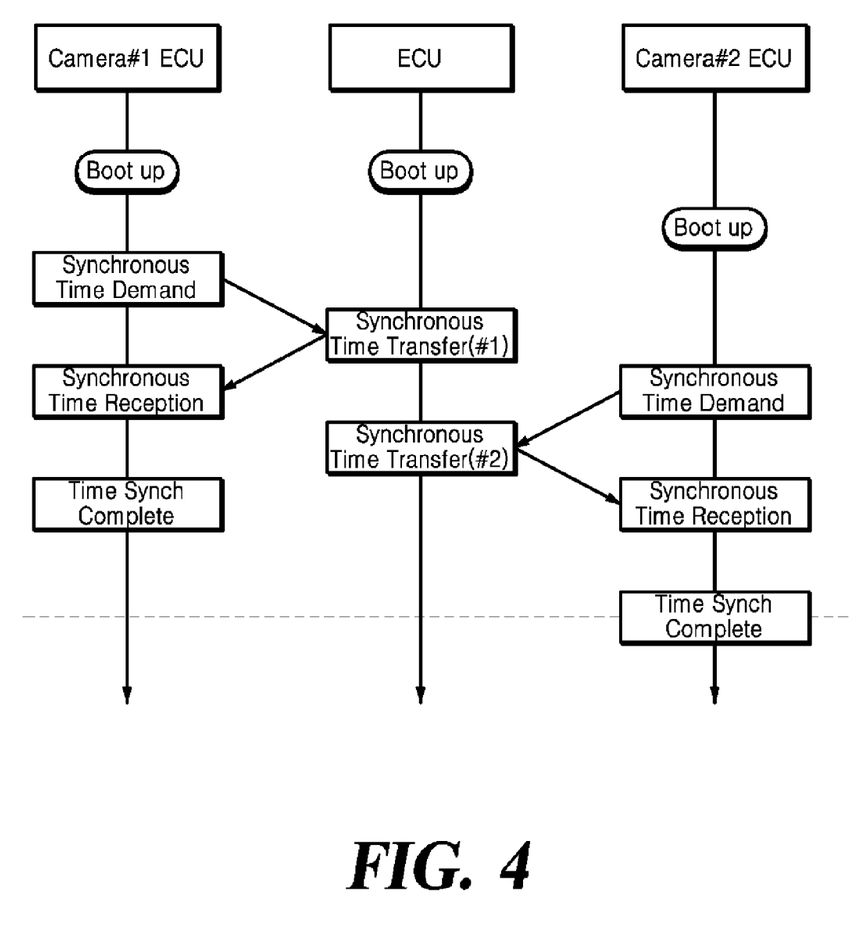
FIG. 4 is a diagram illustrating a time synchronization method according to at least one embodiment of the present disclosure.

As shown in FIG. 4, the time synchronizing unit 210 is responsive to a camera being booted for transmitting a synchronous time demand message for time synchronization to the Ethernet switch unit 120.

The time synchronizing unit 210 is responsive to the synchronous time demand message from the Ethernet switch unit 120 for receiving a time synchronization message including a synchronous time, e.g., GM clock time information.

The time synchronizing unit 210 synchronizes the time between the camera and the Ethernet switch unit 120 based on the received GM clock time information.

In at least one embodiment, the time synchronizing unit 210 of each camera performs a time synchronization process with the Ethernet switch unit 120, and all of the cameras for which time synchronization has been completed have a synchronized operation time.

The comparison unit 220 calculates an output error for each camera based on GM clock time information, and, based on the calculation result, it generates and outputs a tolerance compensation value for image synchronization.

To this end, the comparison unit 220 according to at least one embodiment receives video frames captured from the camera, compares the time information of the received video frames with the GM clock time information, and thereby generate and output delay time information for the video frames to be delayed compared to the GM clock time information.

Hereinafter, with reference to FIGS. 5 and 6 together, the operation of the comparison unit 220 will be described.

Figure 5:
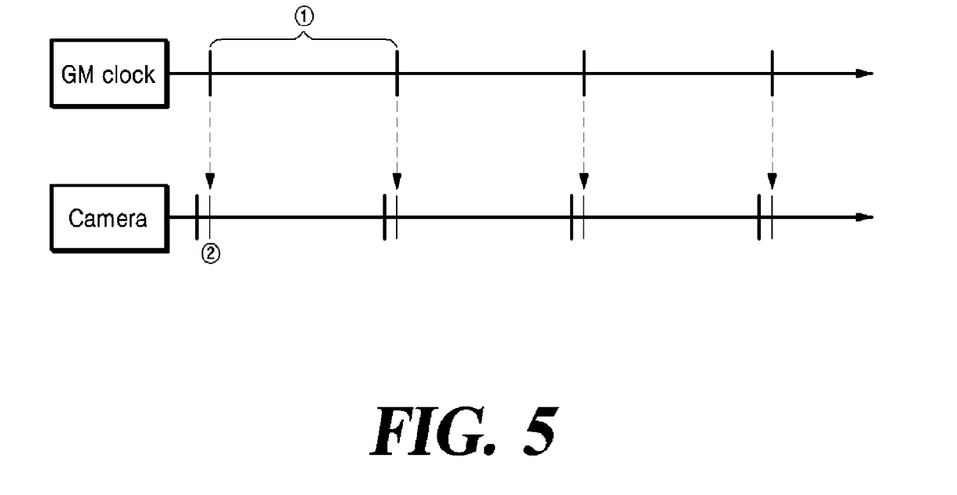
FIG. 5 is a diagram illustrating the occurrence of an error in an image output time point between cameras according to at least one embodiment of the present disclosure.

First, as shown in FIG. 5, the comparison unit 220 splits the GM clock time information into a plurality of information portions based on a time unit preset in relation to a video frame. Here, the preset time unit may be determined according to seconds per frame of the video frames set on the camera.

For example, referring to ① of FIG. 5, the comparison unit 220 may split the GM clock time information into an ideal time of 33.333 ms of one frame of the camera. This is because, when camera images are composed of 30 frames per second, one frame is 1 second/30=33.333 ms.

On the other hand, according to the seconds per frame of the typical video frames, the image outputs of the four-channel cameras need to be outputted at the same time point in units of 33.333 ms. However, the turn-on time most likely structurally different for each camera, and possible illuminance changes on a camera during the operation process causes the camera exposure time to change, resulting in image outputs generated at a time shifted from 33.333 ms as shown in FIG. 5 at ②. When the camera output errors are accumulated, the image outputs deviate from the time interval of one frame.

To remove such a camera output error, the comparison unit 220 generates and outputs delay time information for the video frames based on the GM clock time information which is equally provided to the respective cameras as accurate time information that does not change irrespective of the operation of the individual cameras.

Figure 6:
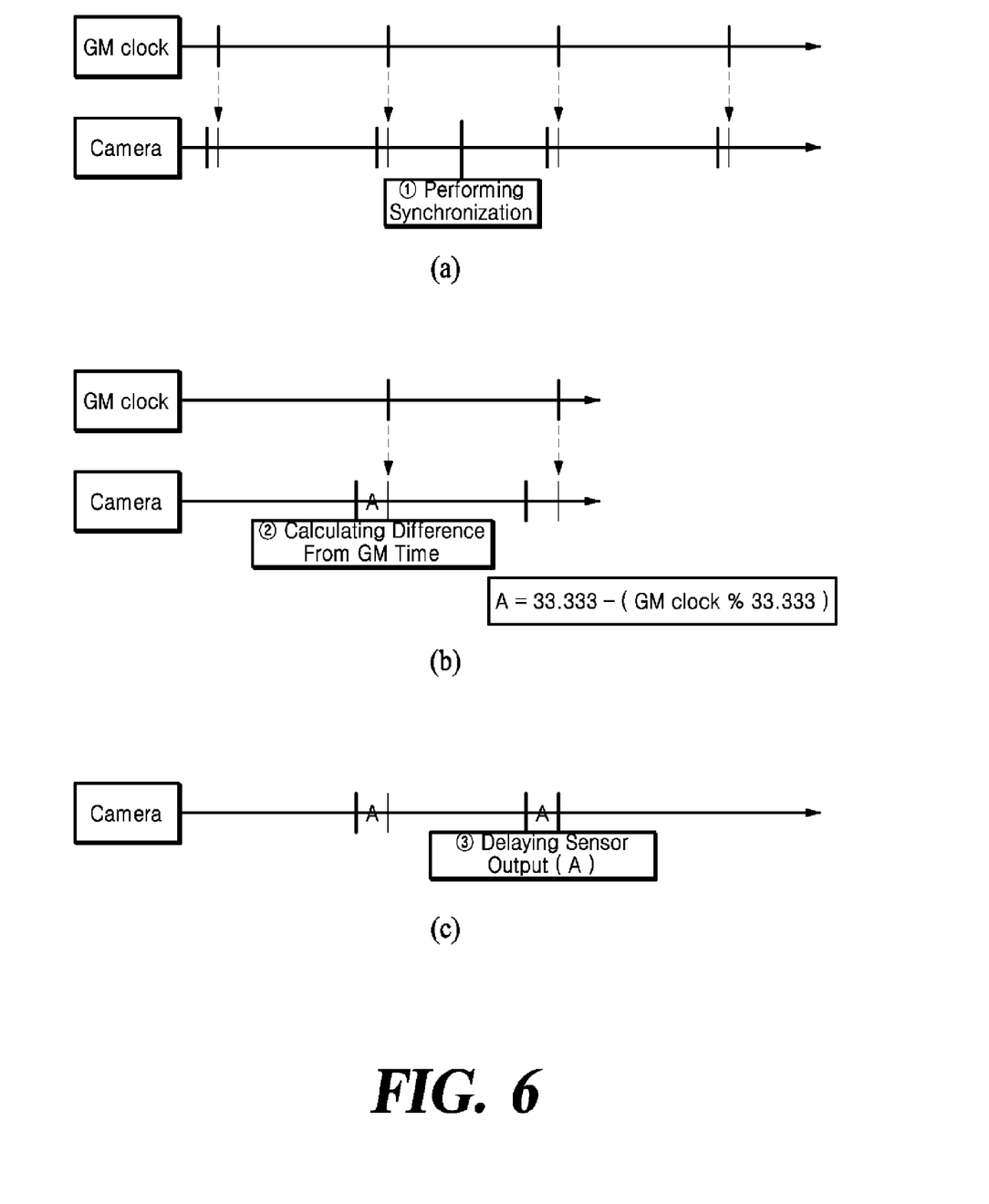
FIGS. 6 and 7 are diagrams illustrating a process of performing image synchronization according to at least one embodiment of the present disclosure.

As shown in FIG. 6 at (a), the comparison unit 220 according to at least one embodiment may generate and output the delay time information for image synchronization by designating a certain section after booting the camera.

On the other hand, the comparison unit 220 is responsive to a confirmation that the time synchronization has been completed between the camera and the Ethernet switch unit 120 that serves as a GM clock for time synchronization for receiving the video frames and the GM clock time information that are inputted to generate and output the delay time information.

As shown in FIG. 6 at (b), the comparison unit 220 compares a start time of the information portion of the GM clock time information with an output time of a corresponding video frame that corresponds to the information portion and thereby generates and outputs, as the delay time information, a degree to which the corresponding video frame deviates from the information portion.

The image synchronizing unit 230 is a device that performs image synchronization based on the delay time information from the comparison unit 200.

The image synchronizing unit 230 utilizes the delay time information generated by the comparison unit 200 as a tolerance compensation value for image synchronization between four-channel cameras, and it delays the image output time of the corresponding camera as much as determined by the delay time information. This means that, as a result, the image outputs from the four-channel cameras are controlled to be generated in synchronization with the GM clock time information.

As shown in FIG. 6 at (c), the image synchronizing unit 230 generates, as determined by the delay time information, a delayed output of a video frame that corresponds to the time of performing the image synchronization.

Figure 7:
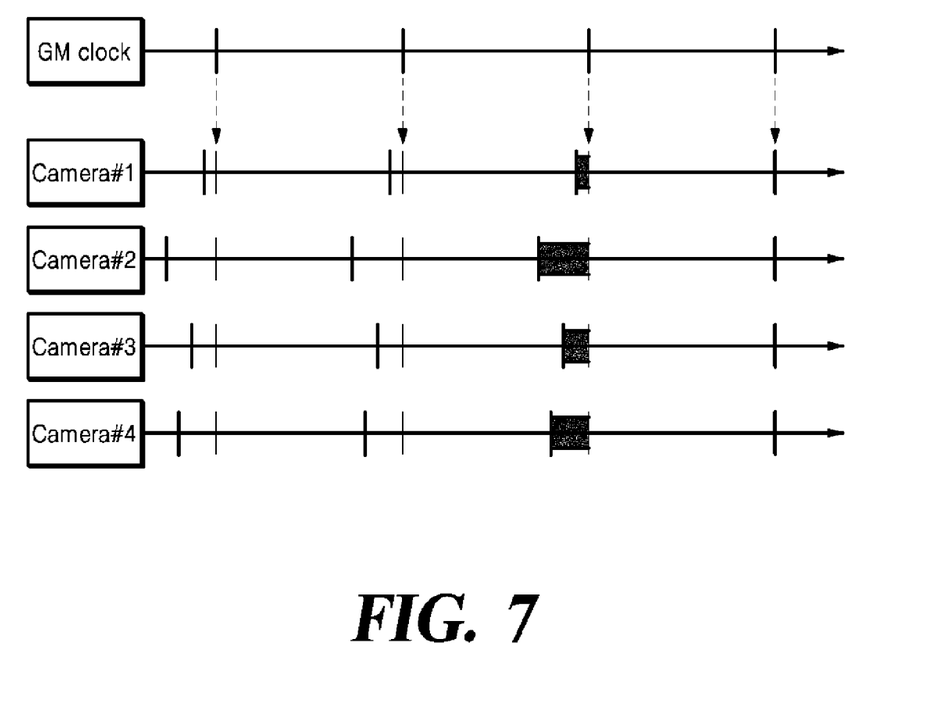

As a result shown in FIG. 7, with the image synchronization method according to at least one embodiment of the present disclosure, synchronization is performed by delaying the image output times of the four cameras according to the GM clock time information, respectively, which brings the cameras in satisfactory conditions required for tolerance compensation.

Figure 3:
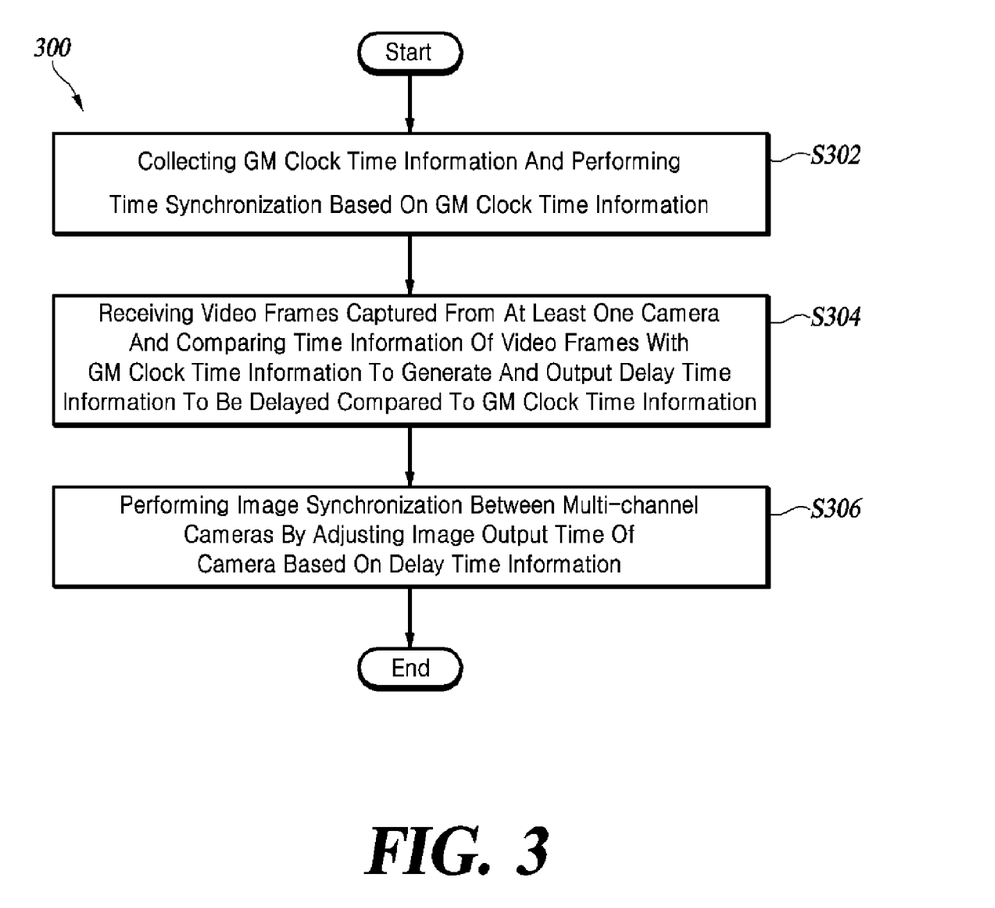
FIG. 3 is a flowchart illustrating an image synchronization method according to at least one embodiment of the present disclosure.

FIG. 3 is a flowchart illustrating an image synchronization method 300 according to at least one embodiment of the present disclosure.

The electronic control apparatus 200 collects GM clock time information and performs time synchronization based on the GM clock time information (Step S302). In Step S302, the electronic control apparatus 200 receives GM clock time information from the Ethernet switch unit 120 serving as a GrandMaster and performs a time synchronization process based on the GM clock time information.

The electronic control apparatus 200 receives the video frames captured from a camera among multi-channel cameras and compares the time information of the video frames with the GM clock time information of Step S302 to generate and output the delay time information for the video frames to be delayed compared to the GM clock time information (S304). In Step S304, the electronic control apparatus 200 splits the GM clock time information into a plurality of information portions based on a time unit preset in relation to the video frames.

The electronic control apparatus 200 compares the start time of the information portion of the GM clock time information with the output time of the corresponding video frame that corresponds to that information portion, and it generates and outputs, as the delay time information, the degree to which the corresponding video frame deviates from the information portion.

The electronic control apparatus 200 adjusts the image output time of the camera based on the delay time information generated in Step S304 to perform image synchronization between the four-channel cameras (S306). In Step S306, the electronic control apparatus 200 uses the delay time information as a tolerance compensation value for the image synchronization between the four-channel cameras and thereby delays the image output time of the corresponding camera as much as determined by the delay time information.

Here, since Steps S302 to S306 correspond to the operations of the respective components of the electronic control apparatus 200 described above, a further detailed description will be omitted.

Although the steps in FIG. 3 are described to be sequentially performed, they merely instantiate the technical idea of some embodiments of the present disclosure. Therefore, a person having ordinary skill in the pertinent art could incorporate various modifications, additions, and substitutions in practicing the present disclosure by changing the sequence described by FIG. 3 or by performing one or more of the steps in FIG. 3 in parallel, without departing from the gist and the nature of at least one embodiment of the present disclosure, and hence the steps in FIG. 3 are not limited to the illustrated chronological sequences.

The method 300 of synchronizing camera images as illustrated in FIG. 3 may be implemented as a computer program and recorded on a computer-readable recording medium such as a CD-ROM, RAM, ROM, a memory card, a hard disk, a magneto-optical disk, a storage device, etc.

As described above, the present disclosure in some embodiments achieves synchronization of camera images based on GrandMaster (GM) clock time information, by performing an image synchronization process for adjusting the image outputs of the 4-channel cameras to be generated in synchronization with the use of GM clock time information collected in the time synchronization process, whereby fundamentally solving the issue of performance degradation due to image tolerances in the SVM system while minimizing the use of communication protocols to achieve simplified system specifications and reduced system load.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An electronic control apparatus, comprising:
a time synchronizing unit configured to collect Grand-Master (GM) clock time information and to perform time synchronization based on the GM clock time information;
a comparison unit configured to receive video frames captured from a camera among multi-channel cameras, to compare time information of the video frames with the GM clock time information, and to thereby generate and output delay time information for the video frames to be delayed compared to the GM clock time information; and
an image synchronizing unit configured to perform image synchronization between the multi-channel cameras by adjusting an image output time of the camera based on the delay time information.

2. The electronic control apparatus of claim 1, wherein the comparison unit is configured to generate and output the delay time information for the image synchronization at a predetermined period and to provide the delay time information with the image synchronizing unit.

3. The electronic control apparatus of claim 1, wherein the comparison unit is configured to receive the video frames and the GM clock time information responsive to a confirmation that the time synchronization has been completed between the camera and an Ethernet switch unit that serves as a GM clock for time synchronization, and to generate and output the delay time information.

4. The electronic control apparatus of claim 1, wherein the comparison unit is configured to split the GM clock time information into a plurality of information portions based on a preset time unit in relation to the video frames, and to generate and output the delay time information by comparing time information of the information portions with the GM clock time information.

5. The electronic control apparatus of claim 4, wherein the preset time unit is determined according to seconds per frame of the video frames, which are set on the camera.

6. The electronic control apparatus of claim 4, wherein the comparison unit is configured to compare a start time of the information portion with an output time of a corresponding video frame that corresponds to the information portion, and to thereby generate and output, as the delay time information, a degree to which the corresponding video frame deviates from the information portion.

7. The electronic control apparatus of claim 1, wherein the image synchronizing unit is configured to use the delay time information as a tolerance compensation value for the image synchronization between the multi-channel cameras, and to delay the image output time of the camera as much as determined by the delay time information so that image outputs from the multi-channel cameras are outputted at the same time in synchronization with the GM clock time information.

8. The electronic control apparatus of claim 7, wherein:
- the image synchronizing unit is configured to delay the image output time for a video frame as much as determined by the delay time information; and
- the video frame corresponds to a time point immediately after the image synchronization is performed.

9. A method of synchronizing images, comprising:
- performing a time synchronizing process, comprising:
  - collecting GrandMaster (GM) clock time information; and
  - performing time synchronization based on the GM clock time information;
- performing a comparison process, comprising:
  - receiving video frames captured from a camera among multi-channel cameras;
  - comparing time information of the video frames with the GM clock time information; and
  - calculating and outputting delay time information for the video frames to be delayed compared to the GM clock time information; and
- performing an image synchronizing process, comprising:
  - performing image synchronization between the multi-channel cameras by adjusting an image output time of the camera based on the delay time information.

10. The method of claim 9, wherein the performing of the comparison process comprises:
- splitting the GM clock time information into a plurality of information portions based on a preset time unit in relation to the video frames; and
- calculating and outputting the delay time information by comparing time information of the information portions with the GM clock time information.

11. The method of claim 10, wherein the performing of the comparison process comprises:
- comparing a start time of the information portion with an output time of a corresponding video frame that corresponds to the information portion; and
- calculating and outputting, as the delay time information, a degree to which the corresponding video frame deviates from the information portion.

12. The method of claim 9, wherein the performing of the image synchronizing process comprises:
- using the delay time information as a tolerance compensation value for the image synchronization between the multi-channel cameras; and
- delaying the image output time of the camera as much as determined by the delay time information so that image outputs from the multi-channel cameras are outputted at the same time in synchronization with the GM clock time information.

* * * * *